(12) United States Patent
Tanaka

(10) Patent No.: US 6,767,656 B2
(45) Date of Patent: Jul. 27, 2004

(54) MAGNETO-OPTICAL RECORDING MEDIUM AND METHOD OF REPRODUCING THE SAME

(75) Inventor: Tsutomu Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 09/809,475

(22) Filed: Mar. 15, 2001

(65) Prior Publication Data

US 2002/0081459 A1 Jun. 27, 2002

(30) Foreign Application Priority Data

Oct. 26, 2000 (JP) ........................................ 2000-327155

(51) Int. Cl.⁷ ..................... G11B 11/105; C11B 11/12; C11B 11/14
(52) U.S. Cl. ..................... 428/694 ML; 428/694 MM; 428/694 EC; 428/694 IS; 369/13.02; 369/13.35; 369/13.4; 369/13.41; 369/13.42; 369/13.43; 369/13.45; 369/13.46
(58) Field of Search ................ 428/212, 457, 428/692, 693, 694 ML, 694 SL, 694 RE, 694 MM, 694 EC, 694 IS; 368/13.38, 13.4, 13.41, 13.35, 13.42, 13.43, 13.46, 13.45, 13.05, 13.07

(56) References Cited

U.S. PATENT DOCUMENTS 5,258,237 A  * 11/1993  Nakaki et al. ........ 428/694 EC
5,428,585 A  *  6/1995  Hirokane et al. .............. 369/13
5,662,988 A  *  9/1997  Nakayama et al. ......... 428/212
5,723,227 A     3/1998  Matsumoto et al.
5,754,500 A  *  5/1998  Tanaka et al. ................. 369/13
6,117,544 A     9/2000  Hirokane et al.

FOREIGN PATENT DOCUMENTS

| JP | 03-093056 | 4/1991 |
| JP | 3093058 | 4/1991 |
| JP | 4271039 | 9/1992 |
| JP | 5-012731 | 1/1993 |
| JP | 7-244877 | 9/1995 |
| JP | 11143041 | 5/1999 |

* cited by examiner

Primary Examiner—Paul Thibodeau
Assistant Examiner—Nikolas J. Uhlir
(74) Attorney, Agent, or Firm—Greer, Burns & Crain, Ltd.

(57) ABSTRACT

A magneto-optical recording medium comprising four magnetic layers including a mask layer, a reproduction layer, an intermediate layer and a recording layer, wherein the reproduction layer and the recording layer each have a direction of easy magnetization extending in a layer stacking direction at room temperature, the mask layer and the intermediate layer each have a direction of easy magnetization extending in an in-plane direction at room temperature, the mask layer, the reproduction layer, the intermediate layer and the recording layer have Curie temperatures Tc1, Tc2, Tc3 and Tc4, respectively, which satisfy relationships of Tc3<Tc2, Tc3<Tc4 and Tc3<Tc1, and the intermediate layer is a rare-earth-rich magnetic layer.

7 Claims, 9 Drawing Sheets

MAGNETO-OPTICAL RECORDING MEDIUM AND METHOD OF REPRODUCING THE SAME

CROSS-REFERENCE TO RELATED APPLICATION

This application is related to Japanese application No. 2000-327155 filed on Oct. 26, 2000, whose priority is claimed under 35 USC § 119, the disclosure of which is incorporated by reference in its entirety.

BACKGROUND OF THE INVENTION

1. Field of the Invention

The present invention relates to a magneto-optical recording medium to be embodied as a magneto-optical disk, a magneto-optical tape, a magneto-optical card or the like for use with a magneto-optical recording/reproducing apparatus, and method of reproducing the same.

2. Description of the Related Art

In recent years, magneto-optical recording media have come into limelight as external recording devices for computers. Such a magneto-optical recording medium, which is adapted to form submicron recording bits thereon by application of an external magnetic field and a laser beam, has a greater recording capacity than conventional types of external recording media such as floppy disks and hard disks.

A currently available 3.5-inch magneto-optical recording medium, for example, has 1.1-$\mu$m pitch tracks provided on an area thereof defined between 24-mm radius and 40-mm radius concentric circles, and is adapted to circumferentially write marks of a minimum size of 64 $\mu$m to provide a recording capacity of about 640 MB on each side thereof. The magneto-optical recording medium is a rewritable medium having a very high recording density.

However, the recording capacity should further be increased to record a tremendous amount of data and motion pictures for the upcoming multimedia age. For the increase in the recording capacity, a greater amount of recording marks should be formed on the medium. Therefore, marks having a smaller length should be arranged at smaller intervals than the currently employed marks. For higher density recording with this arrangement, a laser beam to be applied to the medium should have a wavelength smaller than 780 nm or 680 nm. In consideration of the practicality, the reduction in the length of the marks is more effective than the reduction in the wavelength of the laser beam.

Various methods have been proposed for data reproduction from marks having a smaller size than the diameter of the laser beam.

Japanese Unexamined Patent Publication No. HEI 1(1989)-143041, for example, proposed a method called "FAD (Front Aperture Detection) method" (first prior art), which is adapted to read a recording mark in a low temperature region within a laser spot while utilizing a high temperature region as a mask region.

Japanese Unexamined Patent Publications No. HEI 3(1991)-93056 and No. HEI 3(1991)-93058 proposed methods called "RAD (Rear Aperture Detection) method" (second prior art), which is adapted to read a recording mark in a high temperature region within a laser spot while utilizing a low temperature region as a mask region.

Japanese Unexamined Patent Publication No. HEI 4(1992)-271039 proposed a method called "RAD double mask method" (third prior art), which is adapted to read a recording mark in an intermediate region between a low temperature region and a high temperature region within a laser spot while utilizing the low temperature region and the high temperature region as mask regions.

Japanese Unexamined Patent Publication No. HEI 5(1993)-12731 proposed a method called "CAD (Center Aperture Detection) method" (fourth prior art).

The prior art methods described above can read a recording mark in a region having a smaller size than the diameter of a spot of a reproduction laser beam, and provide a resolution substantially equivalent to that provided by reproduction with the use of a light spot smaller in diameter than the spot of the reproduction laser beam.

However, the aforesaid prior art methods have the following drawbacks.

The first prior art method, which is adapted for reproduction in the low temperature region, allows for size reduction of the entire system without the need for provision of an initialization magnet, but is not effective for prevention of crosstalk because recording marks in neighboring tracks may be detected to affect the reproduction.

The second prior art method, which is adapted for reproduction in the high temperature region, is effective for prevention of crosstalk, but does not allow for size reduction of the system with the need for provision of an initialization magnet.

The third prior art method is also effective for prevention of crosstalk, and allows for enhancement of reproduction output. However, it is impossible to reduce the size of the system with the need for provision of an initialization magnet as in the second prior art method.

The fourth prior art method requires no initialization magnet, but fails to provide a high reproduction output because there is a larger transition area in which the orientation of magnetization of a reproduction layer is shifted from an in-plane direction to a perpendicular direction.

Since the prior art methods have the drawbacks described above, the inventors of the present invention have proposed, in Japanese Unexamined Patent Publication No. HEI 7(1995)-244877, a magneto-optical recording medium (fifth prior art) which is capable of providing a magnetic super resolution (MSR) and a high reproduction output without the need for provision of an initialization magnet. An explanation will hereinafter be given to the magneto-optical recording medium according to the fifth prior art.

As shown in FIG. 10, the magneto-optical recording medium comprises a reproduction layer 4, an intermediate layer 5 and a recording layer 6 stacked in this order on a substrate (now shown). The reproduction layer 4 is composed of a rare earth-transition metal amorphous alloy such as GdFeCo, and has a direction of easy magnetization extending perpendicularly thereto. The intermediate layer 5 is composed of a rare earth-transition metal amorphous alloy such as GdFeCo, and has a direction of easy magnetization which extends in an in-plane direction at room temperature but is shifted from the in-plane direction to a perpendicular direction when the layer is heated up to a predetermined temperature by application of a reproduction light beam. The recording layer 6 is composed of a rare earth-transition metal amorphous alloy such as TbFeCo, and has a direction of easy magnetization extending perpendicularly thereto. The reproduction layer 4, the intermediate layer 5 and the recording layer 6 have Curie temperatures Tc1, Tc2 and Tc3, respectively, which satisfy relationships of Tc2<Tc1 and Tc2<Tc3. Further, the reproduction layer 4 and the recording layer 6 have coercive forces Hc1 and Hc3, respectively, which satisfy a relationship of Hc3>Hc1 at room temperature.

The reproduction layer 4 serves as a mask for reading a signal or for providing a magnetic super resolution. The intermediate layer 5 has an in-plane magnetization property at room temperature and, when the layer is heated, is exchange-coupled to the recording layer 6, whereby the magnetization direction thereof is copied to the reproduction layer 4. The recording layer 6 is adapted for thermal magnetic recording which is achieved by heating the layer up to a temperature near its Curie temperature with application of a recording magnetic field for inversion of the direction of the magnetization.

For reproduction of data recorded in the recording layer 6, smaller size marks are accurately read by utilizing a temperature gradation generated within a laser spot on the medium.

Erasing, recording and reproducing operations to be performed on the magneto-optical recording medium will be explained with reference to FIGS. 10 to 13. It is herein assumed that an upward bias magnetic field is applied for recording data and a downward bias magnetic field is applied for reproducing and erasing the data. The explanation will be given on the assumption that the reproduction layer 4 and the recording layer 6 are rich in transition metals (TM-rich) and the intermediate layer 5 is rich in rare earth elements (RE-rich).

As shown in FIG. 10, the magneto-optical recording medium is irradiated with an erasing laser beam with a bias magnetic field (erasing magnetic field 16) being applied downward, so that the recording layer 6 is heated at a temperature higher than its Curie temperature thereby to be magnetized downward. The recording medium is cooled to room temperature when it is brought away from the laser beam. At room temperature, the intermediate layer 5 is in an in-plane magnetization layer, so that the reproduction layer 4 and the recording layer 6 are not magnetically coupled to each other.

Therefore, the reproduction layer 4 is uniformly magnetized downward by application of a magnetic field having a relatively low intensity equivalent to that of the erasing bias magnetic field.

As shown in FIG. 11, only a recording site of the recording medium is irradiated with a high intensity laser beam with a bias magnetic field (recording magnetic field 17) being applied upward, whereby only the data recorded site is magnetized upward. The recording medium is cooled to room temperature when it is brought away from the laser beam. At room temperature, the intermediate layer 5 is in the in-plane magnetization layer, so that the reproduction layer 4 and the recording layer 6 are not magnetically coupled to each other. Therefore, the reproduction layer 4 is uniformly magnetized downward by application of a magnetic field having a relatively low intensity equivalent to that of the bias magnetic field.

Next, an explanation will be given to the reproducing operation. In a low temperature region of a laser spot within a region 20 to which a reproducing magnetic field 14 is applied, the exchange-coupling force between the intermediate layer 5 and the recording layer 6 is weak, so that the magnetization of the intermediate layer 5 is oriented in the direction of the reproducing magnetic field and the magnetization of the reproduction layer 4 is oriented upward opposite to the direction of the magnetization of the intermediate layer 5 by an exchange-coupling force (front mask 13a). In a high temperature region, on the other hand, the intermediate layer 5 and the recording layer 6 are exchange-coupled to each other, and the intermediate layer 5 and the reproduction layer 4 are exchange-coupled to each other as shown in FIG. 12. Therefore, the magnetization direction of the recording layer 6 is copied to the reproduction layer 4, so that data recorded in the recording layer 6 can be read. This reproducing process is referred to as "single mask reproduction".

In the high temperature region, the recording medium is heated at higher than the Curie temperature of the intermediate layer 5, so that the reproduction layer 4 is uniformly magnetized downward in the direction of the bias magnetic field as shown in FIG. 13. Therefore, the reproduction layer 4 serves as a mask (rear mask 13b). This reproducing process is referred to as "double mask reproduction".

When a magneto-optical output is differentially detected, a magneto-optical signal is read neither in the low temperature region nor in the high temperature region, but only in an intermediate temperature region, because the low temperature region and the high temperature region serve as the masks within the laser spot. This allows for super resolution reproduction and provides a high reproduction output without provision of an initialization magnet, so that data can accurately be reproduced from marks having a size smaller than a diffraction limit of the wavelength of the laser beam. In FIGS. 10 to 13, a reference character A denotes a moving direction of the medium, and reference characters 12 and 18 denote an aperture and a beam spot, respectively.

SUMMARY OF THE INVENTION

However, it has been found that, where the use of a land/groove substrate having a smaller track pitch is desired for higher density recording, for example, the prior art methods present the problem of crosstalk. This is attributable to the fact that, with a track pitch smaller than the diameter of the beam spot, the heat reaches neighboring tracks, whereby recording marks on the neighboring tracks are also brought into a magnetization copied state.

Where the laser beam has a wavelength of 660 nm and an objective lens has an NA of 0.55, for example, the beam spot has a diameter of about 1 $\mu$m. When a land/groove substrate having a track pitch of 0.6 $\mu$m is employed in this case, about 40% of light of the beam is applied to the neighboring tracks to cause crosstalk even with a magnetic super resolution.

The medium for the magnetic super resolution has a higher circumferential resolution to make it possible to read small marks. In order to reduce the width of the tracks for increasing the density of the recording medium, it is necessary to increase a radial resolution.

To solve the aforesaid problem, the present invention is directed to a magneto-optical recording medium which is highly resistant to crosstalk and permits the use of a land/groove substrate having narrower tracks for improvement in recording density.

In accordance with the present invention, there is provided a magneto-optical recording medium which comprises four magnetic layers including a mask layer, a reproduction layer, an intermediate layer and a recording layer, wherein the reproduction layer and the recording layer each have a direction of easy magnetization extending in a layer stacking direction at room temperature, the mask layer and the intermediate layer each have a direction of easy magnetization extending in an in-plane direction at room temperature, the mask layer, the reproduction layer, the intermediate layer and the recording layer have Curie temperatures Tc1, Tc2, Tc3 and Tc4, respectively, which satisfy relationships of Tc3<Tc2, Tc3<Tc4 and Tc3<Tc1, and the intermediate layer is a rare-earth-rich magnetic layer.

In accordance with the present invention, there is provided a reproduction method for the magneto-optical recording medium which comprises applying a laser beam to the magneto-optical recording medium while applying a reproducing magnetic field thereto to form a high temperature region, a medium temperature region and a low temperature region within a beam spot, and reproducing data from the medium temperature region with use of the low temperature region and the high temperature region as masks.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
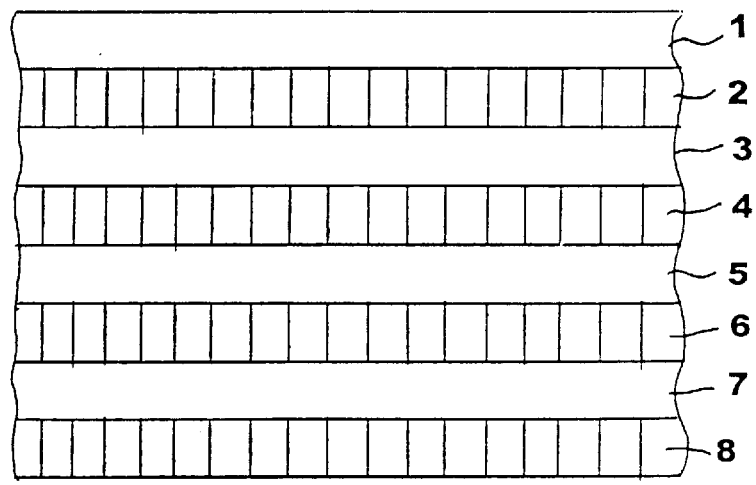
FIG. 1 is a schematic sectional view of a medium according to Example 1.

In accordance with the present invention, a magneto-optical recording medium includes a mask layer, a reproduction layer, an intermediate layer and a recording layer. The reproduction layer and the recording layer each have a direction of easy magnetization extending in a layer stacking direction at room temperature, and the mask layer and the intermediate layer each have a direction of easy magnetization extending in an in-plane direction at room temperature. The mask layer, the reproduction layer, the intermediate layer and the recording layer have Curie temperatures Tc1, Tc2, Tc3 and Tc4, respectively, which satisfy relationships of Tc3<Tc2, Tc3<Tc4 and Tc3<Tc1.

The direction of easy magnetization of the mask layer is shifted to extend perpendicularly to the layer at higher than a predetermined temperature (e.g., a magnetization copying temperature).

Where the aforesaid relationships are satisfied, it is possible to properly control the size of an aperture as measured along the width of the track (or as measured radially where the medium is of a disk shape) during reproduction. Therefore, the recording medium is more resistant to crosstalk than the fifth prior art recording medium having a three-layer structure, and serves for applications with a smaller track pitch. Accordingly, the inventive recording medium allows for higher density recording than the prior art recording medium.

The four magnetic layers of the inventive magneto-optical recording medium including the mask layer, the reproduction layer, the intermediate layer and the recording layer are preferably each composed of a rare earth-transition metal alloy. Specific examples of the rare earth-transition metal alloy include TbFeCo, GdFeCo, TbDyFeCo, TbGdFeCo, DyGdFeCo and GdFeCoSi. It is particularly preferred that the respective layers are amorphous alloy layers. The proportions of rare earth elements and transition metals in each of these magnetic layers may properly be determined depending on the directions of the easy magnetization of the respective layers, the relationships of the Curie temperatures of the respective layers, the thicknesses of the respective layers, and characteristics desired to be imparted to the magneto-optical recording medium.

The three magnetic layers including the mask layer, the reproduction layer and the intermediate layers are preferably each composed of a magnetic material containing Gd. The recording layer is preferably composed of a magnetic material containing Tb.

Further, the four magnetic layers including the mask layer, the reproduction layer, the intermediate layer and the recording layer may be exchange-coupled to one another in this order. Alternatively, the three magnetic layers including the reproduction layer, the intermediate layer and the recording layer may be exchange-coupled to one another in this order, and the mask layer and the reproduction layer may magnetostatically be coupled to each other. In the latter case, a nonmagnetic layer may be interposed between the mask layer and the reproduction layer for the magnetostatic coupling. The nonmagnetic layer may be composed of a material known in this art, e.g., SiN, $SiO_2$, AlN, C or ZnS—$SiO_2$. Other exemplary materials for the nonmagnetic layer include nonmagnetic metals and semiconductors such as Al, Al alloys (AlTi, AlCr), Pt, Au, Si and Ge.

An additional magnetic layer having a direction of easy magnetization extending in an in-plane direction at room temperature may be provided so as to be exchange-coupled to the mask layer. The provision of the magnetic layer makes it easier to control the orientation of the magnetization of the mask layer closer to the in-plane direction. The magnetic layer is preferably disposed between the reproduction layer and the mask layer. The magnetic layer may have the same composition as the reproduction layer, and particularly preferably contains Gd.

The mask layer, the reproduction layer, the intermediate layer, the recording layer, the nonmagnetic layer and the magnetic layer to be exchange-coupled to the mask layer can each be formed as having a predetermined thickness by a known method such as a sputtering method.

The inventive magneto-optical recording medium includes a substrate, such as a plastic substrate, a glass substrate or a silicon substrate, which is typically employed in this art. The substrate may be provided adjacent the mask layer or the recording layer. A dielectric layer such as of SiN or SiO$_2$ may be provided between the substrate and the mask layer. Another dielectric layer such as of SiN or SiO$_2$ may be provided on a side of the recording layer opposite from the intermediate layer, and a heat release layer such as of Al, AlCr or AlTi may be provided on the dielectric layer.

Examples of the present invention will hereinafter be described with reference to the attached drawings.

EXAMPLE 1

FIG. 1 is a schematic sectional view of a magneto-optical recording medium according to Example 1. As shown in FIG. 1, four magnetic layers of the recording medium are exchange-coupled to one another. More specifically, the recording medium includes a polycarbonate substrate 1, and a dielectric layer (SiN layer) 2, a mask layer 3, a reproduction layer 4, an intermediate layer 5, a recording layer 6, a dielectric layer (SiN layer) 7 and a heat release layer (AlTi layer) 8 which are stacked in this order on the substrate 1. The mask layer is a 15-nm thick layer of Gd28Fe48Co24 (numerals provided after the respective elements each denote an atomic percentage, and this definition is hereinafter the same), and the reproduction layer is a 30-nm thick layer of Gd25Fe62Co13. The intermediate layer is a 40-nm thick layer of Gd31Fe69, and the recording layer is a 50-nm thick layer of Tb22Fe60Co18.

The medium having the aforesaid construction was produced in the following manner. Targets of SiN, GdFeCo, GdFe, TbFeCo and AlTi were set in a chamber within a sputtering apparatus. Then, a 1.2-mm thick land-groove substrate having lands and grooves arranged at the same pitch was set in the sputtering apparatus. The chamber in the sputtering apparatus was evacuated to 1×10$^{-5}$ Pa. In turn, argon gas and nitrogen gas were introduced into the chamber so as to be maintained in a partial pressure ratio of 3:2 at a gas pressure of 0.4 Pa. The dielectric layer (SiN layer) 2 was formed as having a thickness of 70 nm on the substrate 1 under the aforesaid conditions by the DC sputtering method.

After the chamber was evacuated again to 1×10$^{-5}$ Pa, argon gas was introduced into the chamber so as to be maintained at 0.8 Pa. Then, the magnetic layers 3 to 6 were respectively formed on the resulting substrate by the DC sputtering method.

Subsequently, the chamber was evacuated again to 1×10$^{-5}$ Pa, and then argon gas and nitrogen gas were introduced into the chamber so as to be maintained in a partial pressure ratio of 3:2 at a gas pressure of 0.4 Pa. Then, the dielectric layer (SiN layer) 7 was formed as having a thickness of 30 nm on the resulting substrate by the DC sputtering method.

After the chamber was evacuated again to 1×10$^{-5}$ Pa, argon gas was introduced into the chamber so as to be maintained at 0.8 Pa. Then, the heat release layer (AlTi layer) 8 was formed as having a thickness of 15 nm on the resulting substrate by the DC sputtering method.

Thus, the magneto-optical recording medium shown in FIG. 1 was obtained.

EXAMPLE 2

Figure 2:
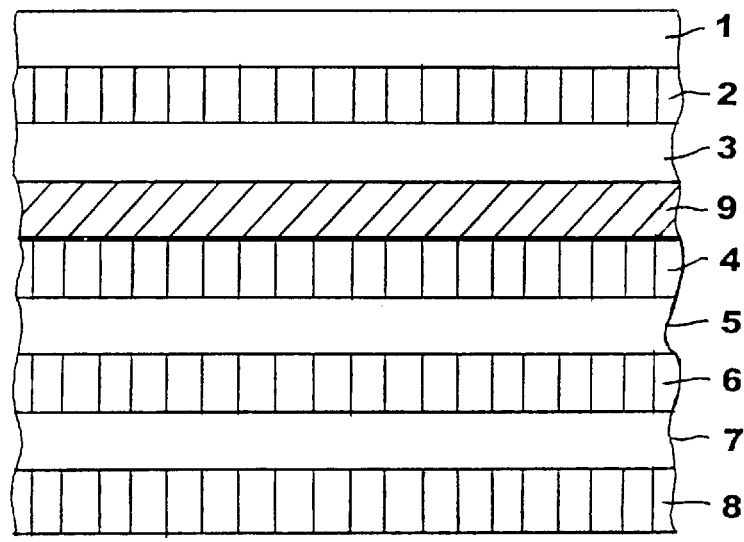
FIG. 2 is a schematic sectional view of a medium according to Example 2.

FIG. 2 is a schematic sectional view of a magneto-optical recording medium according to Example 2. As shown in FIG. 2, three magnetic layers of the recording medium except a mask layer are exchange-coupled to one another, and the mask layer is magnetostatically coupled to a reproduction layer. More specifically, the recording medium includes a polycarbonate substrate 1, and a dielectric layer (SiN layer) 2, a mask layer 3, a nonmagnetic layer (SiN layer) 9, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd28Fe47Co25, and the reproduction layer is a 30-nm thick layer of Gd12Dy12Fe61Co15. The intermediate layer is a 40-nm thick layer of (Gd30Fe67Co3)92Si8, and the recording layer is a 50-nm thick layer of Tb22Fe60Co18.

For production of the medium having the aforesaid construction, the respective layers except the nonmagnetic layer 9 were formed in the same manner as in Example 1. Formation of the nonmagnetic layer (SiN layer) 9 was achieved in the following manner. After the chamber was evacuated to 1×10$^{-5}$ Pa, argon gas and nitrogen gas were introduced into the chamber so as to be maintained in a partial pressure ratio of 3:2 at a gas pressure of 0.4 Pa. Then, the nonmagnetic layer was formed as having a thickness of 3 nm by the DC sputtering method.

EXAMPLE 3

Figure 3:
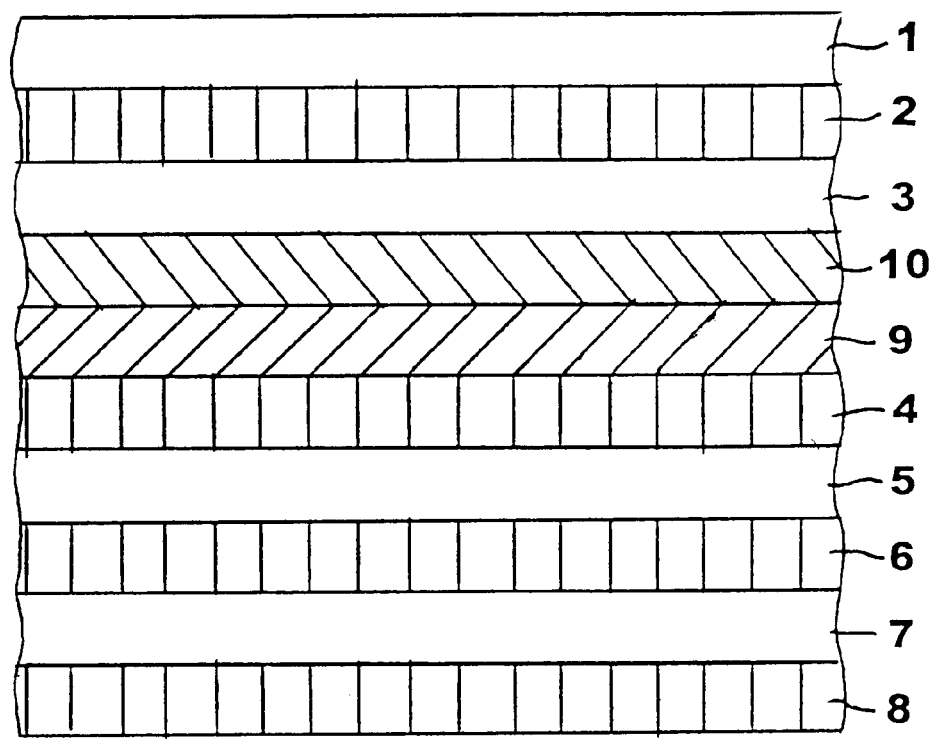
FIG. 3 is a schematic sectional view of a medium according to Example 3.

FIG. 3 is a schematic sectional view of a magneto-optical recording medium according to Example 3. As shown in FIG. 3, the recording medium has substantially the same construction as shown in FIG. 2, but additionally includes a magnetic layer 10 which is provided between the mask layer 3 and the nonmagnetic layer 9 to be exchange-coupled to the mask layer 3. More specifically, the recording medium includes a polycarbonate substrate 1, and a dielectric layer (SiN layer) 2, a mask layer 3, a magnetic layer 10, a nonmagnetic layer (Si layer) 9, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd30Fe45Co25, and the magnetic layer is a 10-nm thick layer of Gd15Fe85. The reproduction layer is a 30-nm thick layer of Gd24Fe61Co15. The intermediate layer is a 40-nm thick layer of (Gd30Fe67Co3)92Si8, and the recording layer is a 50-nm thick layer of Tb22Fe60Co18.

For production of the medium having the aforesaid construction, formation of the respective layers except the magnetic layer 10 were achieved in substantially the same manner as in Examples 1 and 2, except that the nonmagnetic layer had a thickness of 5 nm. Formation of the magnetic layer 10 was achieved in substantially the same manner as the formation of the other magnetic layers, except that GdFe was employed as a target.

Figure 4:
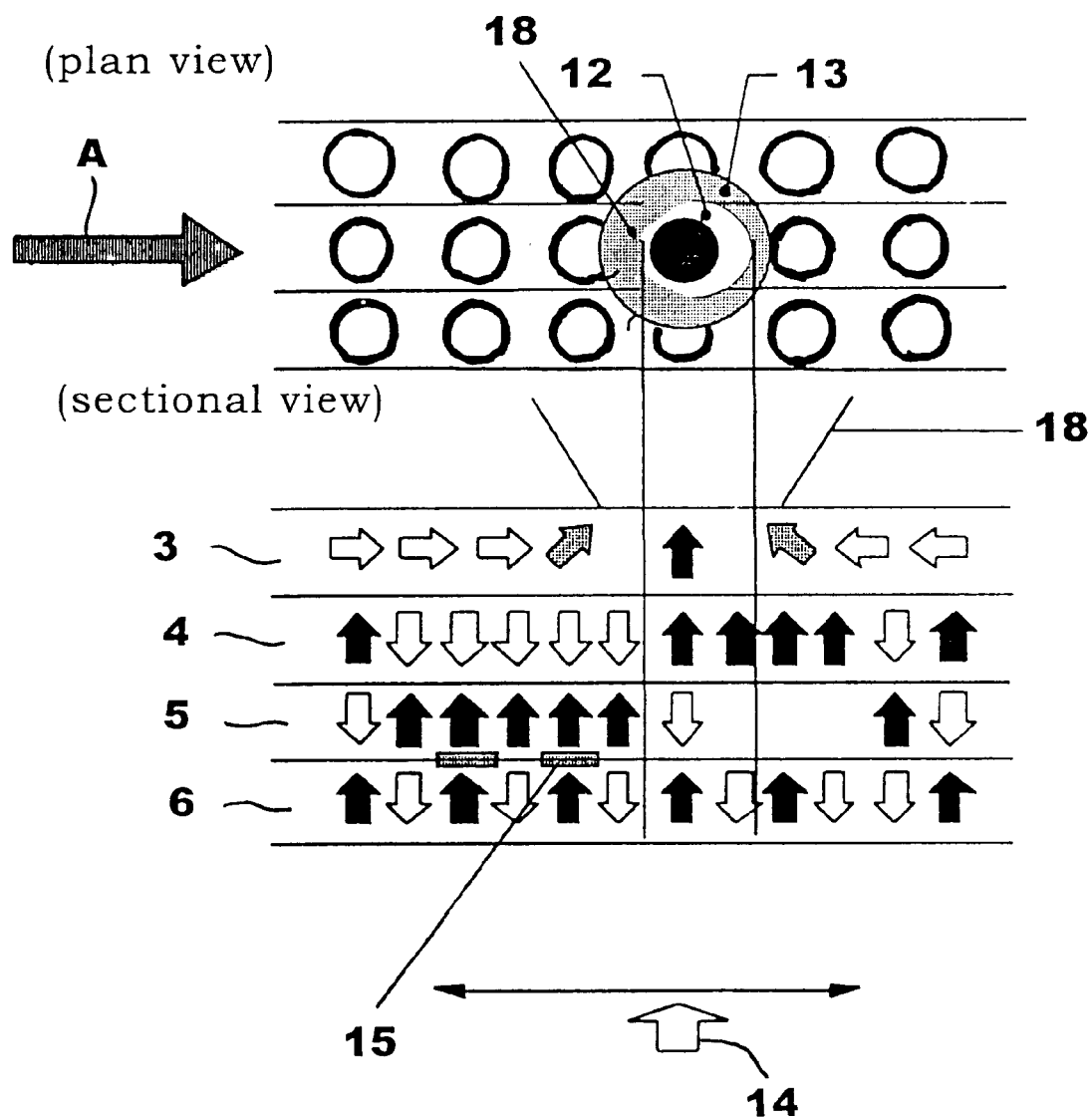
FIG. 4 is schematic diagrams illustrating the medium of Example 1 in a reproduction state.
Figure 5:
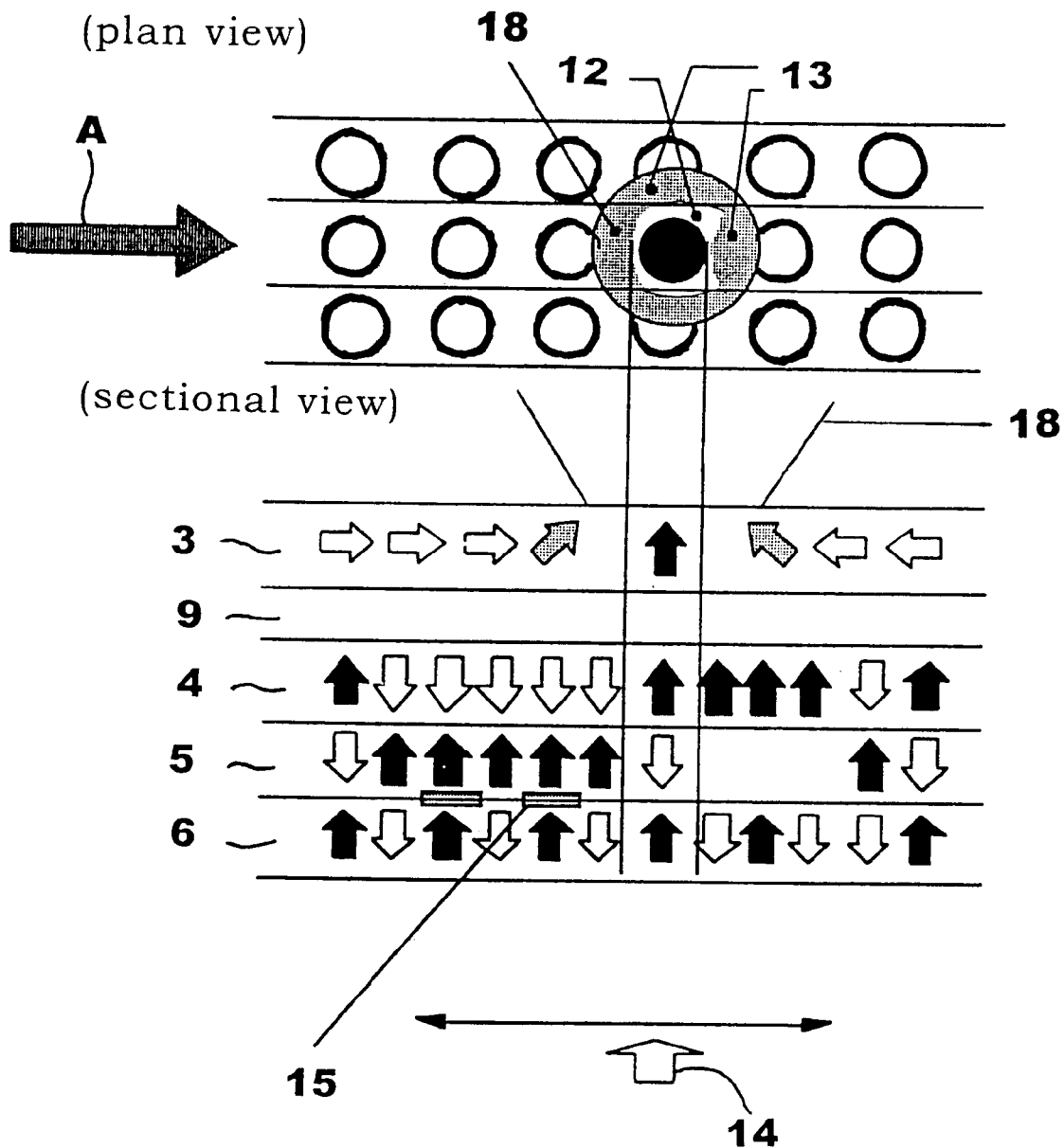
FIG. 5 is schematic diagrams illustrating the medium of Example 2 in a reproduction state.
Figure 6:
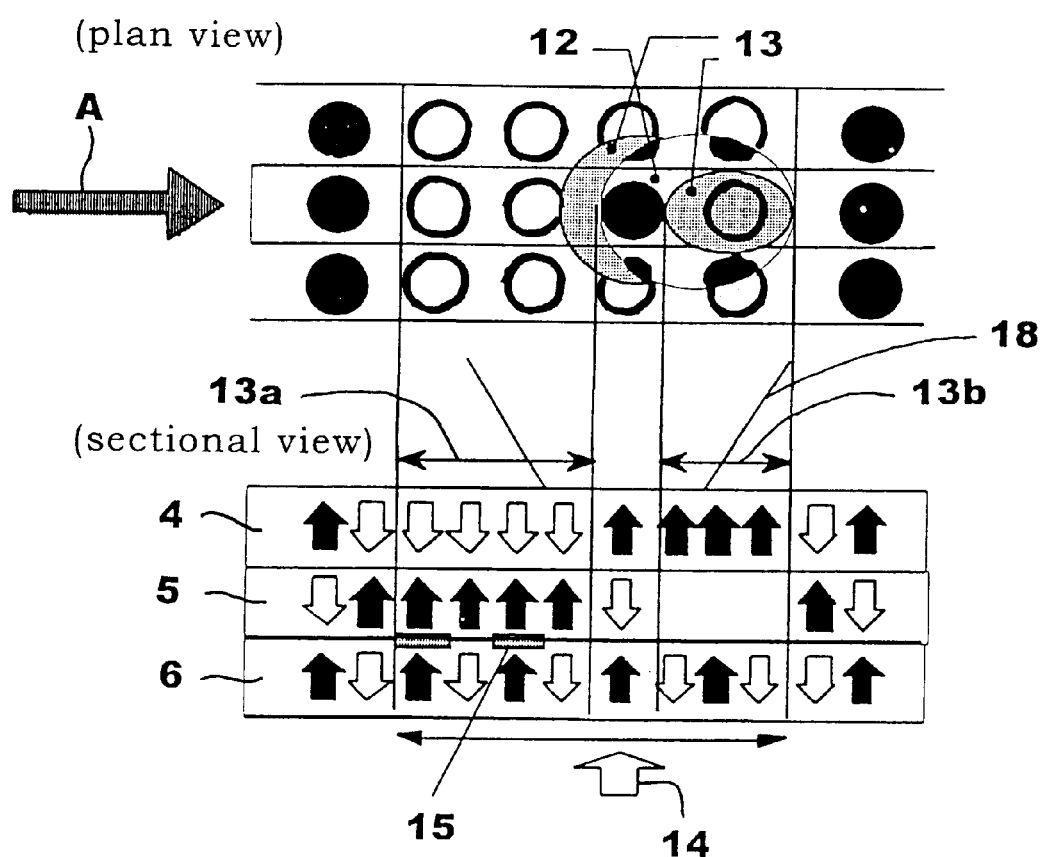
FIG. 6 is schematic diagrams illustrating a medium according to the fifth prior art in a reproduction state.

Evaluation of Magneto-Optical Recording Media of Examples 1 to 3 in Erasing, Recording and Reproducing Operations Erasing, recording and reproducing operations of the magneto-optical recording media produced in the aforesaid manner are performed basically in the same manner as in the fifth prior art method. The magneto-optical recording media of Examples 1 and 2 in a reproduction state are schematically shown in FIGS. 4 and 5, respectively. The fifth prior art recording medium in a reproduction state is schematically shown in FIG. 6. In FIGS. 4 to 6, plan views are shown on the upper side, and sectional views are shown on the lower side. A reference character 12 denotes an aperture, and reference characters 13, 13a and 13b denote a mask, a front mask and a rear mask, respectively. Reference characters 15 and A denote an interface magnetic wall and a medium moving direction, respectively. A reference character 14 denotes a reproduction magnetic field, which is herein applied in a direction which allows for recording. In FIGS. 4 to 6, the substrate, the dielectric layer and the heat release layer are not illustrated.

As can be seen from FIGS. 4 and 5, the mask layer 3 of the magneto-optical recording medium of the present invention has a region which is obliquely magnetized with the aperture being radially narrowed. As compared with the fifth prior art recording medium having no such region as shown in FIG. 6, the inventive recording medium suppresses the crosstalk due to the magnetization state of this region, and is particularly resistant to radial crosstalk. This effect has been confirmed for the exchange-coupling structure (FIG. 1) as well as for the magnetostatic coupling structure (FIGS. 2 and 3).

It has been confirmed that the mask layer has a greater Kerr rotation angle to provide an enhancement effect because the mask layer is Co-richer than the reproduction layer.

In the fifth prior art, the aperture in the reproduction laser beam is relatively small when the laser beam has a lower intensity. Therefore, recording marks on neighboring tracks are not detected because they are not in a magnetization copied state. When the reproduction laser beam has a higher intensity, however, the recording marks on the neighboring tracks are in the magnetization copied state as shown in FIG. 6 thereby to be detected as crosstalk.

Further, it has been confirmed that the magnetostatic coupling structure provides the aforesaid effect even if the dielectric layer is not composed of SiN but composed of $SiO_2$, AlN, C or $ZnS$—$SiO_2$, or a nonmagnetic metal or semiconductor such as Al, an Al alloy (AlTi, AlCr), Pt, Au, Si or Ge. It has also been confirmed that the aforesaid effect can be provided even if the magnetic layer disposed between the mask layer and the nonmagnetic layer and the intermediate layer have the same composition. Further, it has been confirmed that the use of the magnetic layer makes it easier to control the oblique magnetization of the aforesaid region to provide a wider margin for the production of the medium.

Figure 7:
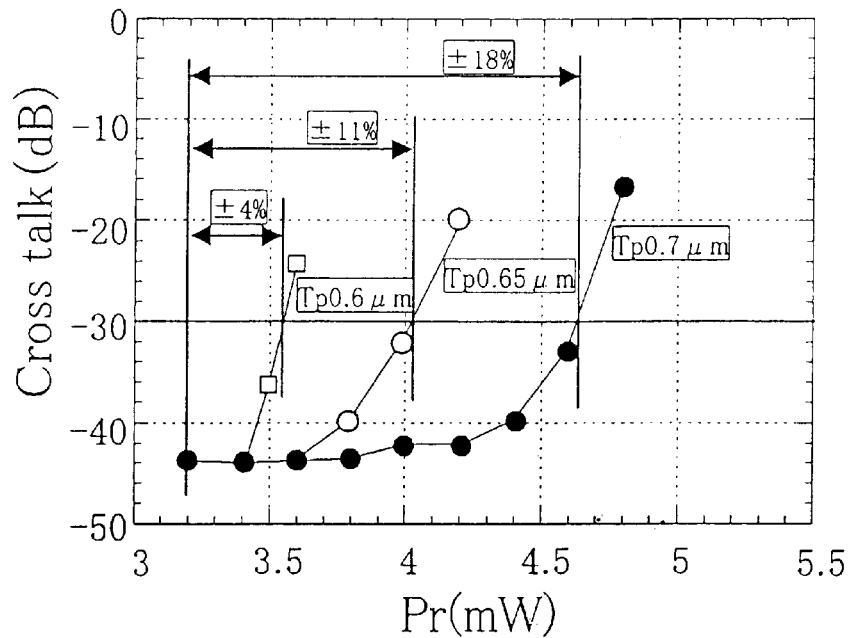
FIG. 7 is a graph illustrating a track pitch dependence of crosstalk occurring in the medium of the fifth prior art.
Figure 8:
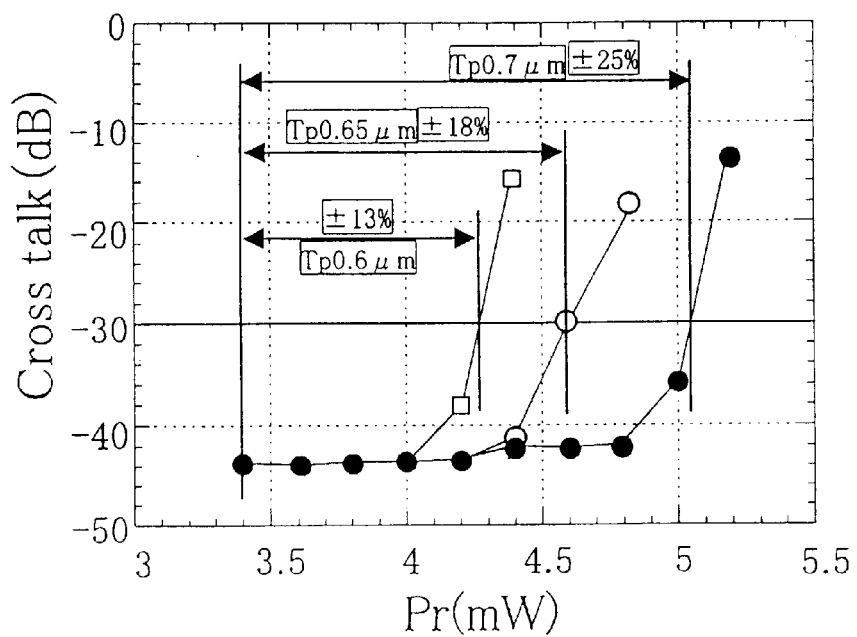
FIG. 8 is a graph illustrating a track pitch dependence of crosstalk occurring in the medium of the present invention.

Measurement of crosstalk was performed on the aforesaid media. The results are shown in FIGS. 7 and 8 and in Table 1. In a measuring instrument employed for the reproducing operation, a semiconductor laser beam had a wavelength of 660 nm, and an objective lens had an NA of 0.55. A beam spot was of a generally round shape having a diameter of 1.0 μm, and the medium was moved at a circumferential speed of 8 m/s. The measurement of the crosstalk was performed in the following manner. No data was recorded on a track of interest, while data was recorded on tracks adjacent to that track. For the measurement of the crosstalk, a difference between signals (carrier) leaking from the adjacent tracks into the track of interest and signals from the adjacent tracks was determined. The signals were measured by a spectral analyzer.

The measurement results for the fifth prior art medium are shown in FIG. 7, in which a reproducing power is plotted as abscissa. As can be seen, heat produced by the beam affected the adjacent tracks to augment the crosstalk as the reproducing power was increased. It is herein assumed that the threshold of the crosstalk is −30 dB. With a track pitch Tp of 0.7 μm, the range of the reproducing power allowable for the reproduction is from 3.2 mW at which the reproduction was started to 4.7 mW with a margin of ±18%. With a track pitch of 0.6 μm, however, the margin was very small (±4%).

The results of the measurement performed in the same manner on the medium of Example 1 of the present invention are shown in FIG. 8. Even with a track pitch of 0.6 μm, a sufficient margin (±13%) was provided, which was greater than in the prior art. The results of the measurement performed in the same manner on the media of Examples 1 to 3 with different track pitches are shown in Table 1.

TABLE 1

| | Tp (μm) | | | |
|---|---|---|---|---|
| | 0.7 | 0.65 | 0.6 | 0.55 |
| Example 1 | ±25% | ±18% | ±13% | ±6% |
| Example 2 | ±26% | ±18% | ±14% | ±8% |
| Example 3 | ±28% | ±21% | ±16% | ±11% |
| Fifth prior art | ±18% | ±11% | ±4% | — |

The media according to the present invention provided better results than the medium of the prior art under any conditions.

EXAMPLE 4

Figure 9:
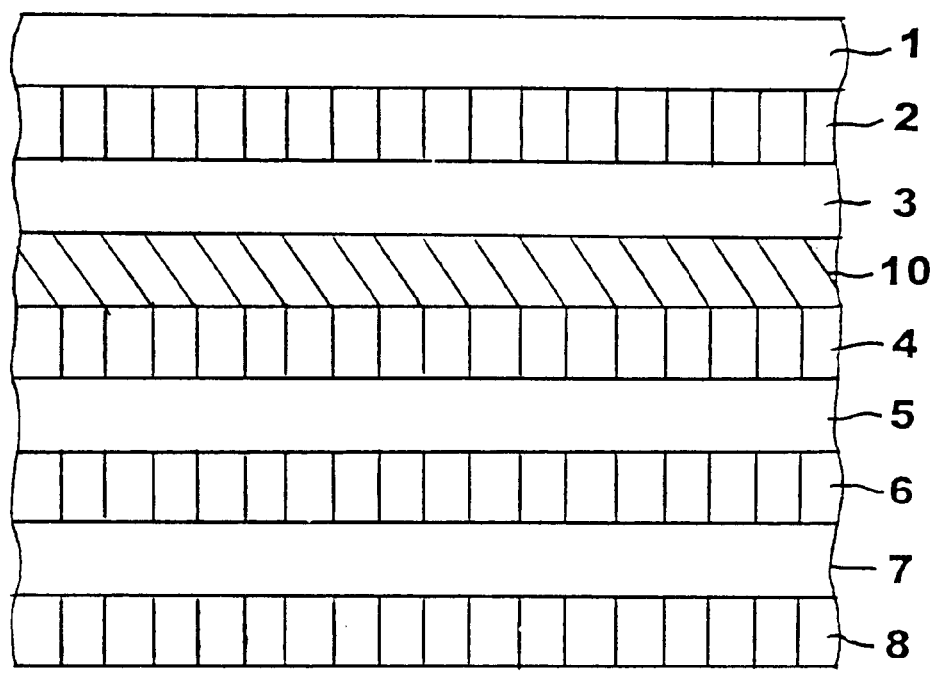
FIG. 9 is a schematic sectional view of a medium according to Example 4.
Figure 10:
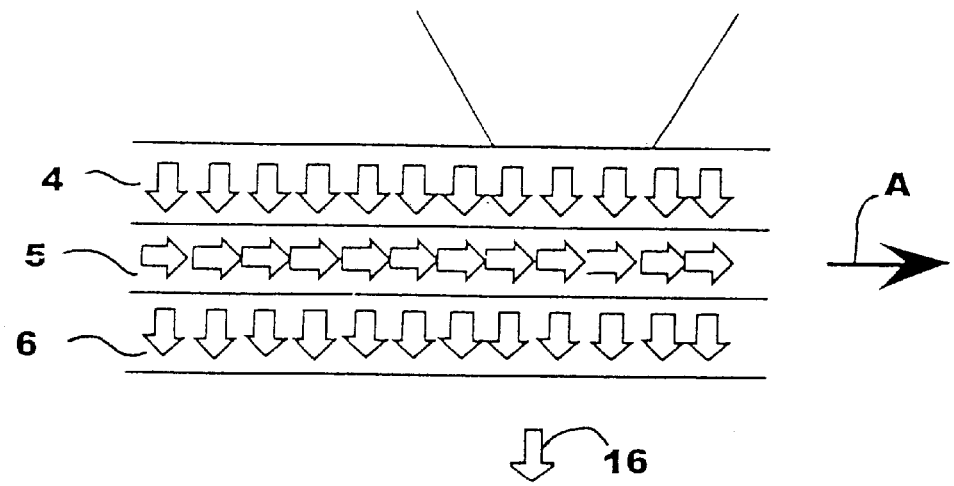
FIG. 10 is a schematic diagram for explaining the principle of an erasing operation to be performed on the medium of the fifth prior art.
Figure 11:
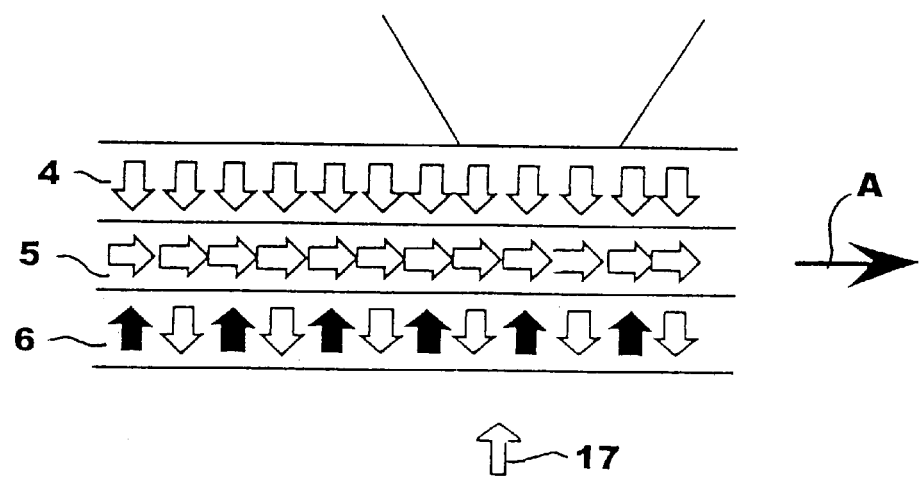
FIG. 11 is a schematic diagram for explaining the principle of a recording operation to be performed on the medium of the fifth prior art.
Figure 12:
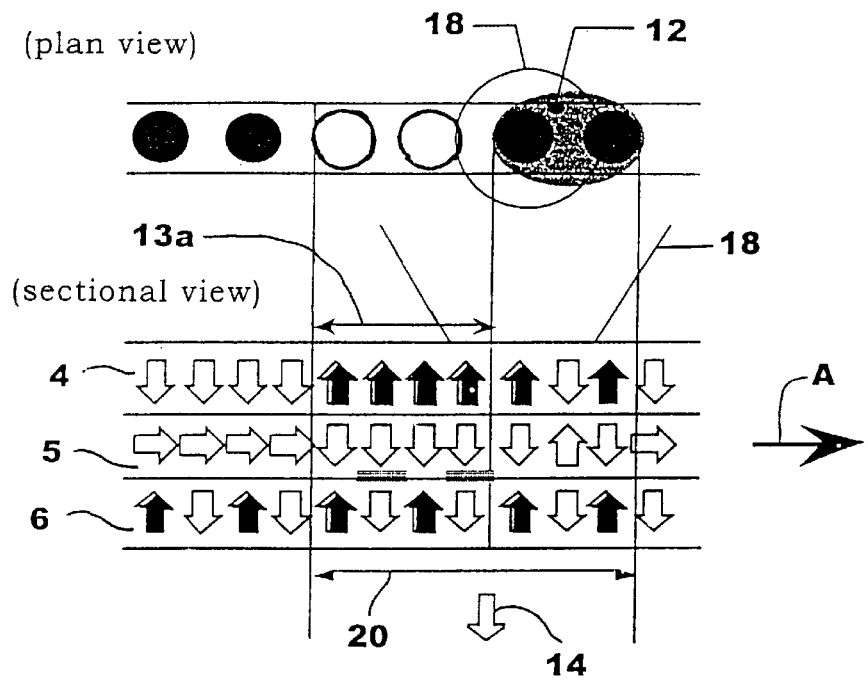
FIG. 12 is schematic diagrams for explaining the principle of a reproducing operation to be performed on the medium of the fifth prior art.
Figure 13:
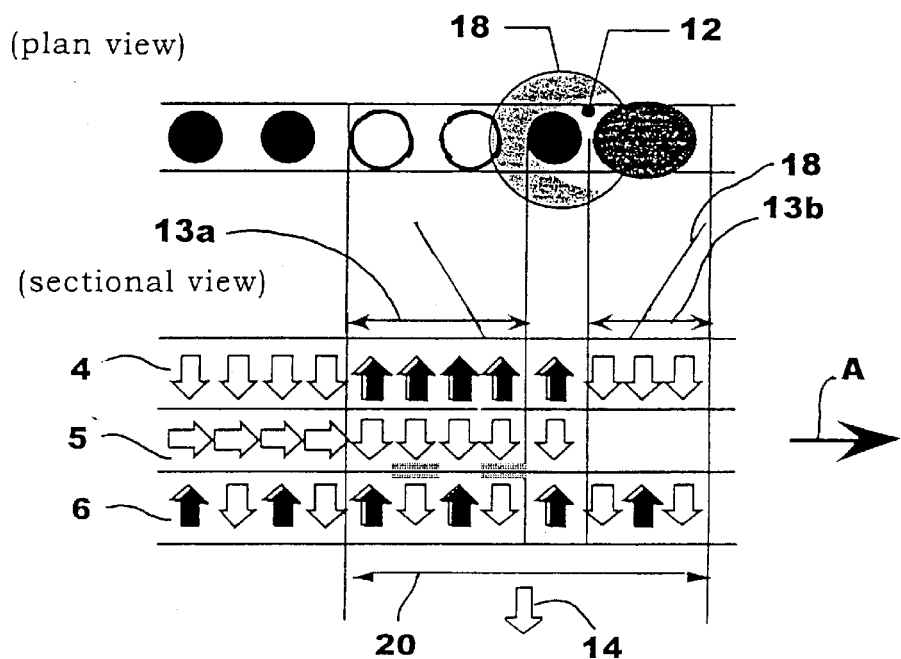
FIG. 13 is a schematic diagram for explaining the principle of a reproducing operation to be performed on the medium of the fifth prior art.

FIG. 9 is a schematic sectional view of a magneto-optical recording medium according to Example 4. As shown in FIG. 9, the recording medium has substantially the same construction as shown in FIG. 1, but additionally includes a magnetic layer 10 which is provided between the mask layer 3 and the reproduction layer 4 to be exchange-coupled to the mask layer 3. More specifically, the recording medium includes a polycarbonate substrate 1, and a dielectric layer (SiN layer) 2, a mask layer 3, a magnetic layer 10, a reproduction layer 4, an intermediate layer 5, a recording layer 6, a dielectric layer (SiN layer) 7 and a heat release layer (AlTi layer) 8 which are stacked in this order on the substrate 1. The mask layer is a 20-nm thick layer of Gd30Fe45Co25, and the magnetic layer is a 10-nm thick layer of Gd15Fe85. The reproduction layer is a 30-nm thick layer of Gd24Fe61Co15. The intermediate layer is a 40-nm thick layer of (Gd30Fe67Co3)92Si8, and the recording layer is a 50-nm thick layer of Tb22Fe60Co18.

For production of the recording medium having the aforesaid construction, formation of the respective layers except the magnetic layer 10 was achieved in the same manner as in Example 1. Formation of the magnetic layer 10 was achieved in the same manner as in Example 3.

The crosstalk characteristic of the medium thus obtained was determined. As a result, the medium had substantially the same crosstalk characteristic as in Example 3.

In accordance with the present invention, the size of an aperture as measured along the width of a track can properly be controlled during reproduction. Therefore, the inventive magneto-optical recording medium is more resistant to crosstalk than the recording medium of the fifth prior art having a three-layer structure, and serves for applications with a smaller track pitch. Accordingly, the inventive recording medium allows for higher density recording than the prior art recording medium.

What is claimed is:

1. A magneto-optical recording medium comprising:
   four magnetic layers including, in respective stacked order, a mask layer, a reproduction layer, an intermediate layer, and a recording layer,
   the reproduction layer and the recording layer each having a direction of easy magnetization extending in a layer stacking direction at room temperature, the mask layer and the intermediate layer each having a direction of easy magnetization extending in an in-plane direction at room temperature, the mask layer, the reproduction layer, the intermediate layer and the recording layer having Curie temperatures Tc1, Tc2, Tc3 and Tc4, respectively, which satisfy relationships of Tc3<Tc2, Tc3<Tc4 and Tc3<Tc1, the intermediate layer being a rare-earth-rich magnetic layer.

2. A magneto-optical recording medium as set forth in claim 1, further comprising a nonmagnetic layer provided between the mask layer and the intermediate layer.

3. A magneto-optical recording medium as set forth in claim 2, wherein the nonmagnetic layer is composed of a material selected from the group consisting of SiN, $SiO_2$, AlN, C, ZnS—$SiO_2$, Al, AlTi, AlCr, Pt, Au, Si and Ge.

4. A magneto-optical recording medium as set forth in claim 1, further comprising a magnetic layer which has a direction of easy magnetization extending in an in-plane direction at room temperature and is exchanged-coupled to the mask layer.

5. A magneto-optical recording medium as set forth in claim 4, wherein the magnetic layer contains Gd.

6. A magneto-optical recording medium as set forth in claim 1, wherein three magnetic layers including the mask layer, the reproduction layer and the intermediate layer each contain Gd.

7. A reproduction method for a magneto-optical recording medium as set forth in claim 1, comprising applying a laser beam to the magneto-optical recording medium while applying a reproducing magnetic field thereto to form a high temperature region, a medium temperature region and a low temperature region within a beam spot, and reproducing data from the medium temperature region with use of the low temperature region and the high temperature region as masks.

* * * * *